United States Patent [19]

Nakamoto et al.

[11] Patent Number: 4,680,368

[45] Date of Patent: Jul. 14, 1987

[54] ULTRAVIOLET CURABLE INK COMPOSITION

[75] Inventors: Hideo Nakamoto; Fumito Aosai, both of Nagoya; Hiroshi Fukushima, Kasugai; Eriko Suda, Nagoya, all of Japan

[73] Assignee: Mitsubishi Rayon Company Limited, Tokyo, Japan

[21] Appl. No.: 870,084

[22] Filed: Jun. 3, 1986

[30] Foreign Application Priority Data

Jun. 5, 1985 [JP] Japan .................................. 60-122169

[51] Int. Cl.$^4$ .............................................. C08G 18/67
[52] U.S. Cl. ......................................... 528/49; 106/20; 522/6; 522/7; 522/30; 522/48; 526/301; 528/48; 528/51; 528/72; 528/75
[58] Field of Search ....................... 528/49, 48, 51, 72, 528/75; 522/6, 7, 30, 48; 526/301; 106/20

[56] References Cited

U.S. PATENT DOCUMENTS

| | | | |
|---|---|---|---|
| 3,883,352 | 5/1975 | Kloczewski et al. | 430/286 |
| 4,018,940 | 4/1977 | Morgan | 528/49 |
| 4,072,770 | 2/1978 | Ting | 427/54.1 |
| 4,271,258 | 6/1981 | Watariguchi | 522/30 |
| 4,608,409 | 8/1986 | Coady et al. | 524/199 |

Primary Examiner—Maurice J. Welsh
Attorney, Agent, or Firm—Kenyon & Kenyon

[57] ABSTRACT

An ultraviolet curable ink composition comprising, as main components,
(A) a polyurethane poly(meth)acrylate obtained by reacting a polyisocyanate compound of the formula:

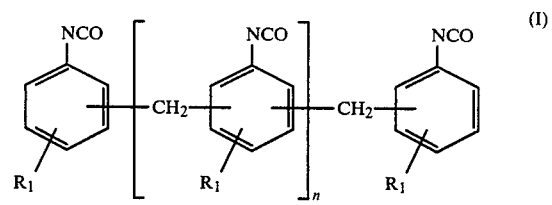

wherein $R_1$ is a hydrogen atom or a methyl group, and n is an integer of from 1 to 20, with a hydroxyl group-containing (meth)acrylate, and having, in one molecule, at least two (meth)acryloyl groups and at least two urethane bonds,
(B) a radical polymerizable low molecular weight compound, and
(C) a photopolymerization initiator.

8 Claims, No Drawings

ULTRAVIOLET CURABLE INK COMPOSITION

The present invention relates to an ultraviolet curable ink composition. More particularly, it relates to an ultraviolet radiation curable screen printing ink composition useful as a solder resist for printed circuit boards.

In recent years, there have been active movements, in the fields of printed circuit boards as well, for substituting ultraviolet curable inks for the conventional hot-air drying cure type inks with a view to rationalization of the drying process. Particularly, such substitution is most advanced in the field of solder resist inks. As compared with the conventional hot-air drying cure type inks, the ultraviolet curable inks have a much faster curing speed, and they also have an advantage that they are curable only by ultraviolet radiation and thus the drying up on a screen printing plate can be avoided. On the other hand, it is difficult to obtain a printing ink having electric properties, mechanical properties, thermal properties and chemical properties required for a permanent protective coating for printed circuit boards in a well balanced state for the practical purpose.

Conventional ultraviolet curable solder resist inks comprise, as the main components, an epoxy acrylate obtained by reacting an epoxy resin with acrylic acid and having, in one molecule, at least two acryloyl groups and/or a polyurethane polyacrylate obtained by reacting a polyisocyanate compound with a hydroxyl group-containing acrylate and having, in one molecule, at least two acryloyl groups and at least two urethane bonds, as the base resin, and a radical polymerizable low molecular weight compound added for the purpose of controlling the viscosity and improving the adhesion to the boards, and a photopolymerization initiator to initiate the polymerization of the above-mentioned unsaturated compound by the irradiation of ultraviolet rays. However, these epoxy acrylates are not yet fully satisfactory with respect to the adhesion and flexibility, although they exhibit excellent performance with respect to the curing speed, hardness and solvent resistance.

Further, polyurethane polyacrylates are usually excellent in the flexibility and adhesion, but substantially inferior to the above-mentioned epoxy acrylates in the heat resistance, chemical resistance, moisture resistance, hardness and ultraviolet curability. Various studies have been made to complement the drawbacks of the two materials. For instance, U.S. Pat. No. 4,072,770 discloses an improvement of the mechanical properties of a polyester urethane acrylate. However, the advantage can not be utilized for the printed circuit boards because the polymer is inferior in other properties.

Polyene-polythiol-type compositions having excellent heat resistance and adhesion as well as relatively good flexibility of the coating film, are disclosed in U.S. Pat. Nos. 3,883,352 and 4,018,940. However, polythiol type compounds usually have a drawback that they have strong odor. Further, it has been proposed to blend the two types to complement the mutual drawbacks in U.S. Pat. No. 4,271,258. Certain properties can be improved by this method, but the essential drawbacks of the individual base resins can not be eliminated.

In view of the above problems, the present inventors have conducted extensive researches with an aim to provide an ultraviolet curable ink composition having a high curing speed and excellent hardness, solvent resistance, chemical resistance, moisture resistance and heat resistance, as well as good flexibility and adhesion to the substrate, particularly an ultraviolet curable screen printing ink composition useful as a solder resist for printed circuit boards. As a result, it has been found that the above object can be attained by an ultraviolet curable ink composition comprising, as main components, (A) a polyurethane poly(meth)acrylate obtained by reacting a polyisocyanate compound of the formula:

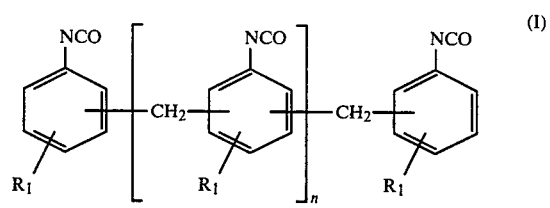

wherein $R_1$ is a hydrogen atom or a methyl group, and n is an integer of from 1 to 20, with a hydroxyl group-containing (meth)acrylate, and having, in one molecule, at least two (meth)acryloyl groups and at least two urethane bonds, (B) a radical polymerizable low molecular weight compound, and (C) a photopolymerization initiator.

Now, components (A) to (C) to be used for the ultraviolet curable ink composition of the present invention will be described in detail with reference to specific Examples. In this specification, "(meth)acrylate" means either one of "acrylate" and "methacrylate". Likewise, "(meth)acrylic acid" means either one of "acrylic acid" and "methacrylic acid".

Firstly, the polyurethane poly(meth)acrylate as component (A) is prepared by reacting a polyisocyanate compound of the above formula I with a hydroxyl group-containing (meth)acrylate.

The polyisocyanate compound of the formula I is a polyisocyanate compound having a so-called novolak structure. By using a polyisocyanate compound having such a structure, it is possible to improve to a large extent, the heat resistance, solvent resistance, chemical resistance, hardness, etc. which used to be the weak points of a polyurethane poly(meth)acrylate, while maintaining the adhesion to the substrate and flexibility, which are the merits of the polyurethane poly(meth)acrylate.

In the formula I, $R_1$ is a hydrogen atom or a methyl group. An ethyl group or a higher alkyl group is not usually useful, since such a compound is hardly available.

n is an integer of from 1 to 20. If $n=0$ and $R_1=H$, the typical compound of the formula I is MDI (diphenylmethane diisocyanate). However, this isocyanate does not provide an adequate merit specific to the above-mentioned novolak structure. On the other hand, if n exceeds 20, the viscosity of the polyurethane poly(meth)acrylate tends to be too high to be useful as an ink.

As the hydroxyl group-containing (meth)acrylate to be reacted with the above-mentioned polyisocyanate compound, there may be mentioned a so-called hydroxy (meth)acrylate such as 2-hydroxyethyl (meth)acrylate, 2-hydroxypropyl (meth)acrylate, 2-hydroxybutyl (meth)acrylate or 4-hdyroxybutyl (meth)acrylate, a reaction product of glycidyl (meth)acrylate with a carboxyl group-containing compound, and an addition reaction product of (meth) acrylic acid with a monoepoxy compound. However, 2-hydroxyethyl acrylate is most preferred in view of the reactivity with the polyisocyanate compound of the formula I and the photocurability of the resulting polyurethane poly(meth)acrylate as well as from the viewpoint of costs. Further, polyisocyanate compounds other than those represented by the formula I and (poly) hydroxyl group-containing compounds other than the above-mentioned hydroxyl group-containing (meth)acrylates, may be incorporated and reacted so long as the above-mentioned properties are not impaired.

As the polyisocyanate compounds other than those represented by the formula I, there may be mentioned, for instance, diisocyanates such as tolylenediisocyanate, xylylenediisocyanate, hexamethylenediisocyanate, 4,4'-diphenylmethanediisocyanate, lysinediisocyanate, isophoronediisocyanate, dimeric acid diisocyanate and trimethylhexanediisocyanate, and triisocyanates. Likewise, as the (poly)hydroxyl group-containing compounds other than the hydroxyl group-containing (meth)acrylates, there may be mentioned neopentyl glycol, 2,2,4-trimethyl-1,3-pentanediol, 1,6-hexanediol, triethylene glycol, trimethylol propane, pentaerythritol, dipentaerythritol, hydrogenated bisphenol A, a dioxyalkyl ether which is an adduct of bisphenol A and/or hydrogenated bisphenol A with ethylene oxide or propylene oxide, polycaprolactonediol, and a low molecular weight polyester polyol having hydroxyl groups at the terminal or on the side chain.

The reaction of the polyisocyanate compound with the hydroxyl group-containing (meth)acrylate is usually an addition reaction. This reaction is preferably conducted at a molar ratio of the isocyanate groups to the hydroxyl groups being within a range of from 1:1 (stoichiometric) to 1:1.2 (hydroxy groups being slightly in excess).

The polyurethane poly(meth)acrylate of component (A) thus obtained, is a component which imparts the basic properties of the ink coating film, and provides excellent curability by ultraviolet radiation in air, and the coating layer thereby obtained exhibits excellent heat resistance, solvent resistance, chemical resistance, moisture resistance, flexibility and superior hardness and adhesion to the substrate. Component (A) is incorporated preferably in an amount of from 10 to 80 parts by weight, based on the total amount of 100 parts by weight of components (A) to (C). If it exceeds 80 parts by weight, the viscosity of the ink thereby obtained, tends to be too high. On the other hand, if it is less than 10 parts by weight, the various excellent properties attributable to component (A) tend to decrease.

The radical polymerizable low molecular weight compound of component (B) is incorporated into component (A) primarily to control the viscosity. However, it is used in various combinations with component (A) also to control the hardness or flexibility of the coating layer obtained, or to improve the adhesion to the substrate.

Specific compounds used as component (B) include a hydroxypivalate neopentyl glycol di(meth)acrylate, tetramethylolmethane tetra(meth)acrylate, trimethylolpropane tri(meth)acrylate, pentaerythritol tri(meth)acrylate, 1,6-hexanediol di(meth)acrylate, dipentaerythritol hexa(meth)acrylate, neopentyl glycol di(meth)acrylate, triethylene glycol di(meth)acrylate, tetramethylolmethane tetra(meth)acrylate, 2-ethylhexyl (meth)acrylate, 2-hydroxyethyl (meth)acrylate, N-vinyl-2-pyrrolidone, carbitol (meth)acrylate, tetrahydrofurfuryl (meth)acrylate, isobornyl (meth)acrylate, dicyclopentyl (meth)acrylate, 2-hydroxypropyl (meth)acrylate and various phosphorus-containing vinyl monomers. In the present invention, the adhesion to the substrate, particularly to copper, will be remarkably improved by incorporating a small amount of a phosphorus-containing vinyl monomer such as {bis(methacryloxyethyl)phosphate},acryloxyethyl phosphate, {bis(acryloxyethyl)phosphate}, {tris(acryloxyethyl)phosphate}, 3-chloro-2-acidphosphoxy propyl methacrylate, Kayama-PM-21 and Kayama-PA-21, manufactured by Nippon Kayaku K. K. and Torad 63182 and Torad 69476, manufactured by Toto Kasei K. K., into component (B).

Component (B) is incorporated preferably in an amount of from 20 to 90 parts by weight, based on the total amount of 100 parts by weight of components (A) to (C). If it is less than 20 parts by weight, the viscosity of the ink obtained, tends to be too high. On the other hand, if it exceeds 90 parts by weight, the various excellent properties attributable to component (A) tend to decrease. The phosphorus-containing vinyl monomer is used preferably in an amount of from 0.01 to 10 parts by weight, based on the total amount of 100 parts by weight of components (A) and (B). If it is less than 0.01 part by weight, the adhesion tends to be poor, and if it exceeds 10 parts by weight, not only the cost increases, but also the electrolytic corrosion resistance tends to deteriorate.

The photopolymerization initiator of component (C) is an essential component to make the ultraviolet curable ink composition of the present invention curable by ultraviolet radiation. It may be used alone or in combination of two or more different types. Specifically, there may be mentioned benzoin methyl ether, benzoin ethyl ether, benzoin isopropyl ether, benzoin-n-butyl ether, benzyl benzophenone, benzyl dimethyl ketal, methylphenylglyoxylate, chloroanthraquinone, 2,2-diethoxyacetophenone, a mixture of benzophenone and a tertiary amine, 2,2-dimethoxy-2-phenylacetophenone, 1-hydroxycyclohexylphenyl ketone, 2-ethylanthraquinone, 1-chloroanthraquinone and 2-chloroanthraquinone. Among them, anthraquinone compounds are particularly preferred since they are highly active to ultraviolet radiation, and it is thereby possible to obtain an ink coating film having a high quality. Particularly preferred is a combination of anthraquinone or its derivative, a compound of the formula II and a compound of the formula III, whereby the curability can remarkably be improved.

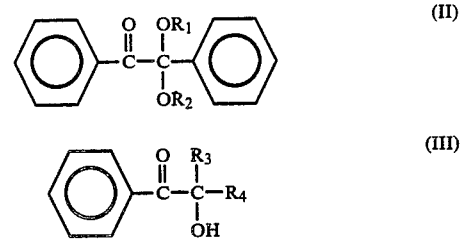

wherein each of $R_1$, $R_2$, $R_3$ and $R_4$ is a hydrogen atom or an alkyl group.

As a specific example of the compound of the formula II, 2,2-dimethoxy-2-phenylacetophenone may be mentioned where $R_1$ and $R_2$ is a methyl group. Likewise, as a specific example of the compound of the formula III, 2-hydroxy-2-methyl-propiophenone may be mentioned where $R_3$ and $R_4$ is a methyl group.

Component (C) is incorporated preferably in an amount of from 0.1 to 15 parts by weight, based on the total amount of 100 parts by weight of components (A) to (C).

To the ultraviolet curable ink composition of the present invention composed mainly of components (A) to (C), known epoxy acrylates, polyurethane acrylates, polyester acrylates and saturated polymers may be mixed for the purpose of balancing the various properties such as heat resistance, solvent resistance, hardness, adhesion, flexibility and corrosion resistance. As the saturated polymers, for instance, (meth)acrylate copolymers, vinyl chloride-vinyl acetate copolymers and polyesters may be mentioned. Further, conventional fillers, defoaming agents, leveling agents, cobwebbing preventive agents, dystuffs or pigments may be incorporated to improve the printing properties as screen printing inks or for coloring purposes.

As the light source to be employed for curing the ultraviolet curable type ink composition of the present invention, it is effective to use a lamp having a radiation wavelength of from 200 to 450 m$\mu$m, such as a low pressure mercury lamp, a high pressure mercury lamp, a xenon lamp, an arc lamp or a gallium lamp. Further, in order to ensure the curing at the deep portion of the ink composition of the present invention, it is possible to improve the curability at the deep portion by heating after irradiation of ultraviolet rays.

In the composition of the present invention, a polyisocyanate compound having a novolak structure is employed as a polyisocyanate to be reacted with a hydroxyl group-containaing (meth)acrylate to obtain a polyurethane poly(meth)acrylate as the base resin, whereby an ink coating film having excellent adhesion to the substrate and flexibility as well as excellent hardness, solvent resistance, chemical resistance, moisture resistance and heat resistance can be obtained.

Now, the present invention will be described in further detail with reference to Examples. However, it should be understood that the present invention is by no means restricted by these specific Examples. In the Examples, "parts" means "parts by weight".

EXAMPLES 1 to 5

450 parts of Millionate MR-400 (manufactured by Nippon Polyurethane Kogyo K. K.) as the polyisocyanate compound of the formula I was reacted with 400 parts of 2-hydroxyethyl acrylate as the hydroxyl group-containing (meth)acrylate to obtain polyurethane polyacrylate (PUA-1). To this polyurethane polyacrylate (PUA-1), a radical polymerizable low molecular weight compound and a photopolymerization initiator were added in the proportions as identified in Table 1, and further an extender pigment (Mystron Paper Talc, manufactured by Tsuchiya Kaolin K. K.) and a color pigment (phthalocyanine green S, manufactured by Dainippon Ink & Chemicals, Inc.) was added. The mixture was kneaded through three rolls. In this manner, ultraviolet curable inks UVS-1 to UVS-5 were prepared. Each ink was coated on a copper-clad sheet in a thickness of 15 $\mu$m, and irradiated by three high pressure mercury lamps (80 W/cm) from a distance of about 20 cm for 10 seconds. The properties of the ink coating films thus obtained are shown in Table 2.

EXAMPLE 6

Polyurethane polyacrylate PUA-2 was obtained in the same manner as PUA-1 in Example 1 except that as the polyisocyanate compound, Millionate MR-200 (manufactured by Nippon Polyurethane Kogyo K. K.) was used instead of Millionate MR-400. An ink (UVS-6, see Table 1) was prepared and cured to obtain an ink coating film in the same manner as in Example 1 except that PUA-1 in Example 1 was changed to PUA-2. The properties of the ink coating film thus obtained are shown in Table 2.

COMPARATIVE EXAMPLE 1

500 parts of Desmodule H (hexamethylene 1,6-diisocyanate, manufactured by Sumitomo Bayer Urethane K. K.) was reacted with 700 parts of 2-hydroxyethyl acrylate to obtain a polyurethane polyacrylate (PUA-3). An ink (UVS-7) was prepared and cured to obtain an ink coating film in the same manner as in Example 1 except that PUA-1 in Example 1 was changed to PUA-3. The properties of the ink coating film thus obtained are shown in Table 2.

COMPARATIVE EXAMPLE 2

500 parts of Epikote #828 (Epibis type epoxy, manfuactured by Yuka Shell K. K.) was reacted with 200 parts of acrylic acid to obtain epoxy acrylate (PEA-1). An ink (UVS-8) was prepared and cured to obtain an ink coating film in the same manner as in Example 1 except that PUA-1 in Example 1 was changed to PEA-1. The properties of the ink coating film thus obtained are shown in Table 2.

TABLE 1

| Proportions of components (parts by weight) | Example No. | | | | | |
|---|---|---|---|---|---|---|
| | 1 | 2 | 3 | 4 | 5 | 6 |
| | Ink | | | | | |
| | UVS-1 | UVS-2 | UVS-3 | UVS-4 | UVS-5 | UVS-6 |
| PUA-1 | 35 | 30 | 10 | 35 | 35 | — |
| PUA-2 | — | — | — | — | — | 35 |
| TMPTA (1) | 40 | 45 | 45 | 40 | 40 | 40 |
| HPNDA (2) | — | 10 | 20 | — | — | — |
| 2HEMA (3) | 20 | 10 | 20 | 25 | 20 | 20 |
| P-1 (4) | 5 | — | 5 | — | 5 | 5 |
| P-3 (5) | — | 5 | — | — | — | — |
| 2EAQ (6) | 5 | 5 | 5 | 5 | 3 | 5 |
| DMPAP (7) | — | — | — | — | 3 | — |
| 2HMPP (8) | — | — | — | — | 3 | — |
| Talc | 50 | 50 | 50 | 50 | 50 | 50 |

TABLE 1-continued

| Proportions of components (parts by weight) | Example No. | | | | | |
|---|---|---|---|---|---|---|
| | 1 | 2 | 3 | 4 | 5 | 6 |
| | Ink | | | | | |
| | UVS-1 | UVS-2 | UVS-3 | UVS-4 | UVS-5 | UVS-6 |
| Phthalocyanine green S | 1 | 1 | 1 | 1 | 1 | 1 |

Notes:
(1) TMPTA: Trimethylpropane triacrylate
(2) HPNDA: Hydroxypivalate neopentyl glycol acrylate
(3) 2HEMA: 2-Hydroxyethyl methacrylate
(4) P-1: Acryloxyethyl phosphate
(5) P-3: Tris(acryloxyethyl)phosphate
(6) 2EAQ: 2-Ethylanthraquinone
(7) DMPAP: 2,2-Dimethoxy-2-phenylacetophenone
(8) 2HMPP: 2-Hydroxy-2-methyl-propiophenone

TABLE 2

| | Examples | | | | | | Comparative Examples | |
|---|---|---|---|---|---|---|---|---|
| | 1 | 2 | 3 | 4 | 5 | 6 | 1 | 2 |
| | UVS-1 | UVS-2 | UVS-3 | UVS-4 | UVS-5 | UVS-6 | UVS-7 | UVS-8 |
| Pencil hardness (1) | 5H | 5H | 5H | 5H | 5H | 5H | 2H | 5H |
| Adhesion (2) | 100/100 | 100/100 | 95/100 | 90/100 | 100/100 | 100/100 | 100/100 | 50/100 |
| Heat resistance (3) | O | O | O | O | O | O | X | O |

Note:
(1) JIS D-0202 8.10
(2) JIS D-0202 8.12 (represented by adhesion rate)
(3) JIS C-6481 (Evaluated by the pencil hardness and adhesion after dipping a test sample in solder at 260° C. for 30 seconds) O: Good, X: Poor

We claim:

1. An ultraviolet curable ink composition comprising, as main components, (A) a polyutethane poly(meth)acrylate obtained by reacting a polyisocyanate compound of the formula:

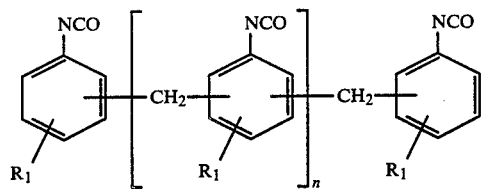

(I)

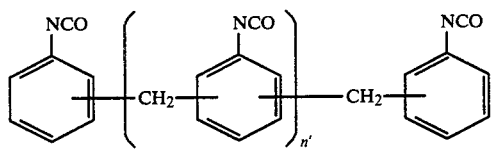

wherein $R_1$ is a hydrogen atom or a methyl group, and n is an integer of from 1 to 20, with a hydroxyl group-containing (meth)acrylate, and having, in one molecule, at least two (meth)acryloyl groups and at least two urethane bonds, (B) a radical polymerizable low molecular weight compound, and (C) a photopolymerization initiator.

2. The ink composition according to claim 1, which comprises from 10 to 80 parts by weight of component (A), from 20 to 90 parts by weight of component (B), and from 0.1 to 15 parts by weight of component (C).

3. The ink composition according to claim 1, wherein the molar ratio of the isocyanate groups to the hydroxyl groups in the polyisocyanate compound and the hydroxyl group-containing (meth)acrylate constituting the polyurethane poly(meth)acrylate (A), is from 1:1 to 1:1.2.

4. The ink composition according to claim 1, wherein the hydroxyl group-containing (meth)acrylate is 2-hydroxyethyl acrylate.

5. The ink composition according to claim 1, wherein the polyisocyanate compound is a compound of the formula:

wherein n' is an integer of from 1 to 5.

6. The ink composition according to claim 1, wherein the radical polymerizable low molecular weight compound (B) contains a phosphorus-containing vinyl monomer.

7. The ink composition according to claim 1, wherein the photopolymerization initiator (C) is anthraquinone or its derivative.

8. The ink composition according to Claim 1, wherein the photopolymerization initiator (C) is a combination of (a) anthraquinone or its derivative,
(b) a compound of the formula:

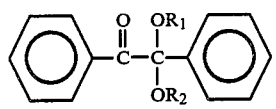

(II)

wherein each of $R_1$ and $R_2$ is a hydrogen atom or an alkyl group, and (c) a compound of the formula:

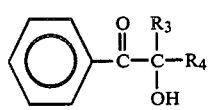

(III)

wherein each of $R_3$ and $R_4$ is a hydrogen atom or an alkyl group.

* * * * *